US012250137B2

(12) United States Patent
Huselton et al.

(10) Patent No.: US 12,250,137 B2
(45) Date of Patent: *Mar. 11, 2025

(54) TRAFFIC AMPLIFICATION FOR TESTING OF A NETWORKING DEVICE

(71) Applicant: Level 3 Communications, LLC, Broomfield, CO (US)

(72) Inventors: Jason Huselton, Erie, CO (US); Noah Weis, Denver, CO (US); Kenton Seward, Arvada, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,825

(22) Filed: Sep. 8, 2023

(65) Prior Publication Data

US 2023/0421476 A1 Dec. 28, 2023

Related U.S. Application Data

(63) Continuation of application No. 17/226,927, filed on Apr. 9, 2021, now Pat. No. 11,757,750.
(Continued)

(51) Int. Cl.
*H04L 43/50* (2022.01)
*G06F 9/455* (2018.01)
(Continued)

(52) U.S. Cl.
CPC .......... *H04L 43/50* (2013.01); *G06F 9/45558* (2013.01); *H04L 43/0817* (2013.01);
(Continued)

(58) Field of Classification Search
CPC . H04L 43/50; H04L 43/0817; H04L 43/0888; H04L 43/16; H04L 47/125;
(Continued)

(56) References Cited

U.S. PATENT DOCUMENTS 4,239,983 A * 12/1980 Edwards ........... H01L 29/76891
257/E29.24
4,334,320 A * 6/1982 Liman .................... G08G 1/094
455/227

(Continued)

FOREIGN PATENT DOCUMENTS

CA 2973825 3/2018
EP 3609132 2/2020
(Continued)

*Primary Examiner* — David R Lazaro
*Assistant Examiner* — Berhanu Shitayewoldetadik

(57) ABSTRACT

A method is disclosed for testing network devices for networks with a large traffic load utilizing one or more traffic load amplifiers to amplify the traffic load. The load amplifiers connected to the device may receive packets of an initial traffic load, multiply or copy the received packet, alter the destination address information in the header of the copied packets to generate packets with different destination addresses, and transmit the altered packets back to the device for further routing. The altered or copied packets may then be routed via the device back to the load amplifier for further amplification. Through this amplification process, a small initial load of packets may be amplified over and over by the load amplifiers until a target traffic load is achieved at the device to test the device performance at a large traffic load.

16 Claims, 6 Drawing Sheets

Related U.S. Application Data

(60) Provisional application No. 63/010,355, filed on Apr. 15, 2020.

(51) Int. Cl.
| | | |
|---|---|---|
| *G06F 11/00* | (2006.01) | |
| *G06F 11/07* | (2006.01) | |
| *G06F 15/16* | (2006.01) | |
| *H04L 12/729* | (2013.01) | |
| *H04L 12/751* | (2013.01) | |
| *H04L 15/16* | (2006.01) | |
| *H04L 43/0817* | (2022.01) | |
| *H04L 43/0888* | (2022.01) | |
| *H04L 43/16* | (2022.01) | |
| *H04L 47/125* | (2022.01) | |

(52) U.S. Cl.
CPC ......... H04L 43/0888 (2013.01); H04L 43/16 (2013.01); H04L 47/125 (2013.01); *G06F 2009/45595* (2013.01)

(58) Field of Classification Search
CPC ............ H04L 41/0895; H04L 41/0803; H04L 43/0894; H04L 49/3009; G06F 9/45558; G06F 2009/45595
USPC .................................................. 709/224, 217
See application file for complete search history.

(56) References Cited

U.S. PATENT DOCUMENTS

| | | | | |
|---|---|---|---|---|
| 8,520,675 | B1* | 8/2013 | Frailong | H04L 49/90 |
| | | | | 370/391 |
| 8,615,010 | B1* | 12/2013 | Masters | H04L 43/12 |
| | | | | 370/390 |
| 10,652,154 | B1* | 5/2020 | Matthews | H04L 41/0645 |
| 10,931,530 | B1* | 2/2021 | Rzehak | H04L 41/0896 |
| 2003/0088664 | A1* | 5/2003 | Hannel | H04L 9/40 |
| | | | | 709/224 |
| 2005/0074236 | A1* | 4/2005 | Urimindi | H04B 10/0793 |
| | | | | 398/12 |
| 2006/0029037 | A1* | 2/2006 | Chen | H04L 47/193 |
| | | | | 370/351 |
| 2007/0076585 | A1* | 4/2007 | Kim | H04H 20/55 |
| | | | | 370/206 |
| 2007/0076586 | A1* | 4/2007 | Kim | H04L 1/0065 |
| | | | | 370/206 |
| 2007/0223388 | A1* | 9/2007 | Arad | H04L 1/24 |
| | | | | 370/242 |
| 2010/0061476 | A1* | 3/2010 | Kim | H04L 1/0065 |
| | | | | 375/295 |
| 2011/0182191 | A1* | 7/2011 | Jackson | H04L 43/50 |
| | | | | 370/250 |
| 2013/0114130 | A1* | 5/2013 | Stampoulidis | H01S 3/06737 |
| | | | | 359/341.1 |
| 2013/0151905 | A1* | 6/2013 | Saha | H04L 43/50 |
| | | | | 714/E11.178 |
| 2013/0310959 | A1* | 11/2013 | Sandu | H04N 21/23439 |
| | | | | 700/94 |
| 2014/0025986 | A1 | 1/2014 | Kalyanaraman | |
| 2014/0160961 | A1* | 6/2014 | Dragulescu | H04L 43/50 |
| | | | | 370/252 |
| 2014/0161451 | A1* | 6/2014 | Graves | H04Q 11/0005 |
| | | | | 398/51 |
| 2015/0134923 | A1* | 5/2015 | Kulkarni | G06F 3/067 |
| | | | | 711/162 |
| 2015/0180743 | A1* | 6/2015 | Jana | H04L 43/045 |
| | | | | 715/736 |
| 2015/0304204 | A1* | 10/2015 | Robitaille | H04L 43/0852 |
| | | | | 370/241 |
| 2015/0326441 | A1* | 11/2015 | Smith | H04L 41/0883 |
| | | | | 370/255 |
| 2016/0028598 | A1* | 1/2016 | Khakpour | H04L 43/50 |
| | | | | 709/224 |
| 2016/0072730 | A1* | 3/2016 | Jubran | H04L 41/14 |
| | | | | 709/224 |
| 2016/0191349 | A1* | 6/2016 | Buege | H04L 41/5067 |
| | | | | 709/224 |
| 2017/0115333 | A1* | 4/2017 | Radic | G01R 23/20 |
| 2017/0161609 | A1* | 6/2017 | Wood | H04L 45/121 |
| 2017/0257343 | A1* | 9/2017 | Mailhot | H04L 61/2575 |
| 2017/0310541 | A1* | 10/2017 | Jin | H04L 67/1097 |
| 2017/0359252 | A1 | 12/2017 | Kumar | |
| 2018/0019967 | A1* | 1/2018 | Ameling | H04L 12/4641 |
| 2018/0139066 | A1 | 5/2018 | Nguyen | |
| 2019/0005047 | A1* | 1/2019 | D'Amore | G06F 16/252 |
| 2019/0075183 | A1* | 3/2019 | Silberkasten | G06F 16/2455 |
| 2019/0215385 | A1 | 7/2019 | Ethier | |
| 2019/0342028 | A1* | 11/2019 | He | H04B 10/613 |
| 2020/0106175 | A1* | 4/2020 | Moates | H01Q 9/36 |
| 2020/0127610 | A1* | 4/2020 | Kusuda | H03F 3/21 |
| 2020/0169969 | A1* | 5/2020 | Davlantes | H04W 16/28 |
| 2020/0252201 | A1* | 8/2020 | Sergeev | H04L 43/10 |
| 2020/0313921 | A1* | 10/2020 | Nguyen | H04L 49/901 |
| 2020/0313996 | A1* | 10/2020 | Krishan | H04L 41/5096 |
| 2021/0328902 | A1 | 10/2021 | Huselton | |

FOREIGN PATENT DOCUMENTS

| | | |
|---|---|---|
| WO | WO-2005099178 | 10/2005 |
| WO | WO-2014030756 | 2/2014 |

\* cited by examiner

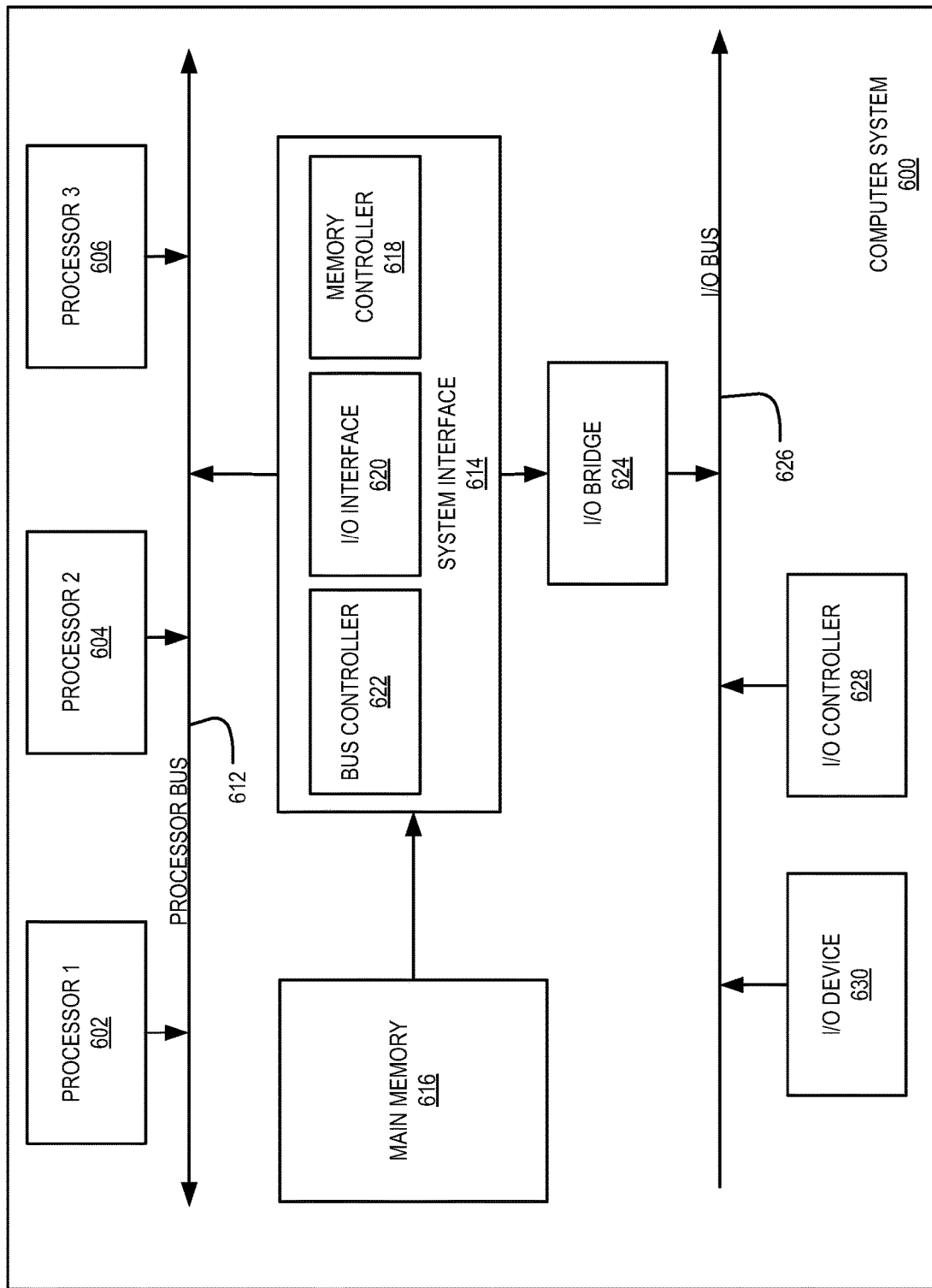

TRAFFIC AMPLIFICATION FOR TESTING OF A NETWORKING DEVICE

TECHNICAL FIELD

Embodiments of the present disclosure generally relate to systems and methods for implementing a telecommunications or data network, and more specifically for systems and methods for testing performance of a network router device by amplifying traffic to the router through one or more traffic load amplifiers.

BACKGROUND

Telecommunication networks provide for the transmission of information across some distance. Various parts of a network may convey information through wired connections, while others may involve various forms of wireless communication and satellite communication. The information conveyed across a telecommunication network may include voice, data and multimedia information, among others. In some instances, the telecommunications network may provide connections between network devices, network services, network computing environments, cloud services, etc. on behalf of customers, which may enable or provide access to a service or enhance a customer's network in some form. For example, telecommunication networks may provide connection to and support of devices included in a large public network, such as the Internet.

To exchange communications, telecommunications networks may include networking devices that receive packets of information that include, among other features, a destination address, such as an Internet Protocol (IP) address or multiprotocol label switching (MPLS) address, that the networking devices may use to route the packets through the network. Such networking devices may include routers, switches, gateways, and the like. In general, the networking devices obtain a destination address from a header of a received packet, reference a routing table to determine a particular network route along which the packet may be transmitted, and route the packet to a next device in the network along the determined route. In this manner, packets are routed through the network to a destination device or network.

Prior to inclusion or implementation in the network, network devices are often tested to ensure proper operation under network conditions. For example, network devices may undergo load stress testing in a lab environment in which the devices are subjected to traffic loads or other settings that mimic or estimate conditions in the target network. However, for large networks that process large number of communication packets, performance testing of network devices may require generation of large traffic loads to mimic the network environment and ensure the network devices operate properly in such an environment. Generation of such large traffic loads may require large and expensive load generators, imposing an onerous testing cost for approval of new networking devices into the network. Thus, network testers or administrators are often faced with a decision to install network devices into the network untested or conduct cost prohibitive testing on such devices when expanding the network.

It is with these observations in mind, among others, that various aspects of the present disclosure were conceived and developed.

SUMMARY

One aspect of the present disclosure relates to a method for testing a network device. The method may include the operation of initiating, from a traffic load generator, an initial testing traffic load to a networking device, the networking device routing a portion of the initial testing traffic load to a first output port of the networking device, the first output port in communication with a load amplifier. The load amplifier may replicate a payload of the first packet of the initial testing traffic load into a replicated packet, alter a heading portion of the replicated packet, the altered heading portion comprising a destination address for the replicated packet, and transmit the first packet and the altered replicated packet to a plurality of input ports of the networking device.

Another aspect of the present disclosure relates to a system for testing a device comprising a load generator transmitting an initial testing traffic load to a networking device, the networking device routing a portion of the initial testing traffic load to a first port of the networking device and a load amplifier system in communication with the first port of the networking device. The load amplifier may replicate a first packet of the initial testing traffic load into a plurality of replicated packets, alter a header portion of each of the plurality of replicated packets to include a destination address for the corresponding replicated packet, and transmit the first packet and each of the altered plurality of replicated packets to a plurality of ports of the networking device.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope

FIG. 6 is a diagram illustrating an example of a computing system which may be used in implementing embodiments of the present disclosure.

DETAILED DESCRIPTION

Figure 1:
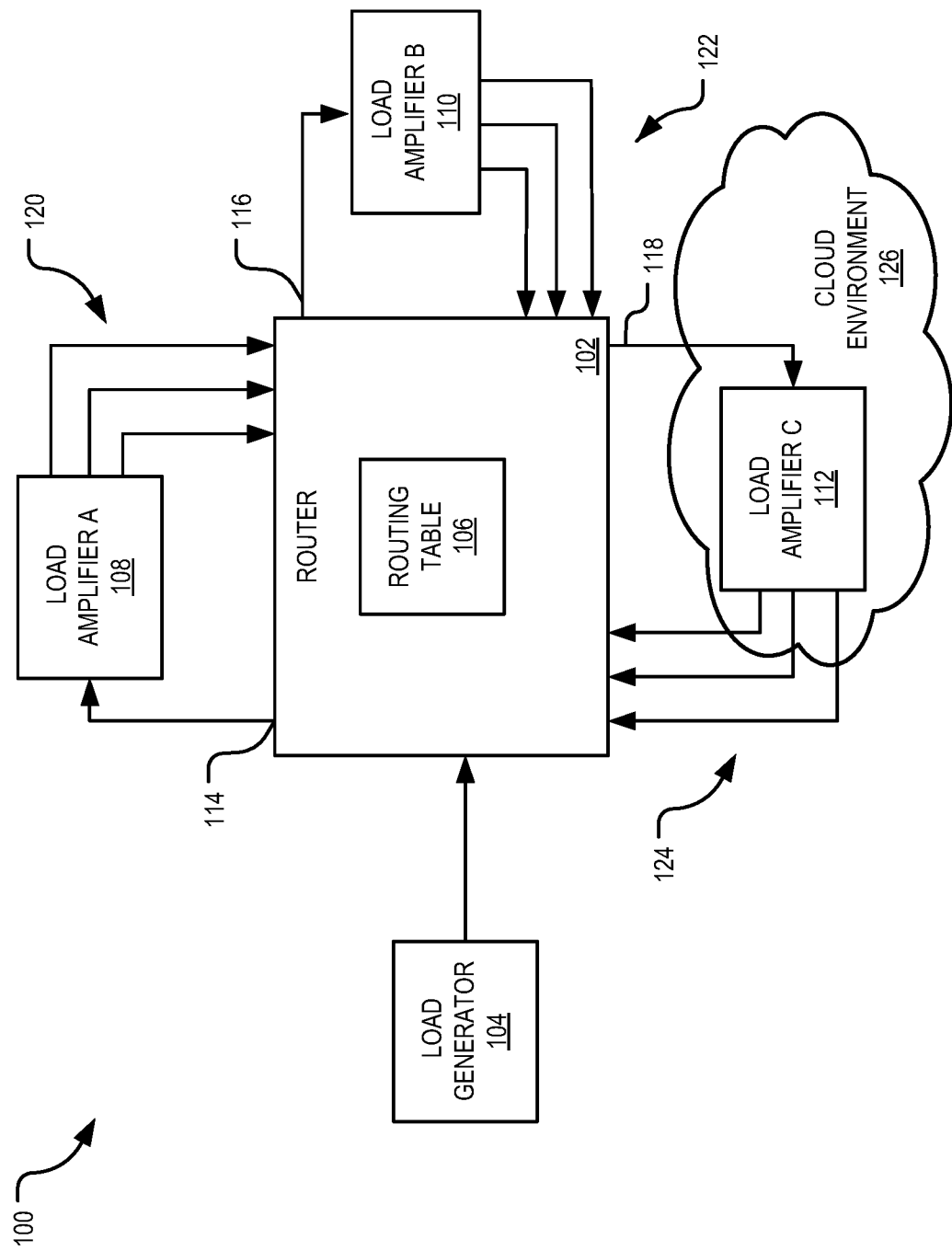
FIG. 1 is a schematic diagram illustrating an exemplary operating environment for load testing a network router utilizing load amplifiers in accordance with aspects of the present disclosure.

Systems and methods are disclosed herein for testing of network devices. Aspects of the present disclosure are particularly beneficial for testing devices intended for networks with a large traffic load, although aspects of the disclosure are not limited to such uses. In one example, a system involves one or more traffic load amplifiers to amplify the traffic load on a router, which load amplifier avoids the need for conventional, large expensive load generating testing devices. In one example, the network devices may be a router device and one or more load amplifiers may be connected to input and/or output ports of the router device. The load amplifiers connected to the router may receive packets from the router, multiply or copy the received packet, alter the destination address information in the header of the copied packets to generate packets with different destination addresses, and transmit the altered packets back to the router for further routing. The altered or copied packets may then be routed via the router back to the load amplifier for further amplification. Through this amplification process, a small initial load of packets may be amplified over and over by the load amplifiers until a target traffic load is achieved at the router to test the router performance at a large (e.g., 100 Gigabyte per second (Gbps)) traffic load. As the load amplifiers are relatively inexpensive to utilize in comparison to large load generators, router testing may be conducted while reducing the cost associated with large test load generation.

In one instance, the load amplifiers may be instantiated in a cloud computing environment such that the number or capacity of the load amplifiers may be scaled in response to testing requirements. For example, resources provided by a cloud computing environment may be used to instantiate one or more virtual machines to execute the operations of the load amplifiers as described herein. For router (or other networking devices) testing applications that require large traffic loads, additional load amplifiers may be instantiated within the cloud computing environment to scale the traffic amplification used for testing the router device. In general, any number of load amplifiers may be instantiated in the cloud environment, as needed, to amplify the traffic load for the testing of the router. In addition, in some instances the load amplifiers may be configured within the cloud environment to alter the header information of received communication test packets to test or otherwise use various aspects or features of the router device. For example, one or more load amplifiers may be configured to alter a MLPS tag information of one or more test communication packets to test MLPS traffic load management of the router. More particularly, the load amplifiers may receive test communication packets and amend the header packet information of the test communication packets such that, when routed back to the router under test, the router processes the altered communication packet in accordance with the altered header information. In this manner, different routing procedures or techniques of the router under test may be stressed by the generated load and the load amplifiers. In another example, one or more load amplifiers may be configured to alter an IP destination address of the packets to test IP traffic management of the router. In general, any aspect of the header information may be altered by the load amplifiers to test various communication protocol or other features of the router under test.

In still another instance, one or more load amplifiers in communication with the router under test may be configured to emulate the topology of the network into which the router is to be installed. For example, the load amplifiers may be configured to alter the header information of one or more test communications to emulate traffic from a particular geographic area, portion of the telecommunications network, device of the telecommunications network, peer networks, and/or peer network devices. In this manner, the load amplifiers may cause the test traffic to emulate other routers, switches, or other network devices of a network in which the router under test is to be installed such that the test traffic load may mimic or emulate the behavior of the network. The topology emulation may therefore provide test results that are more accurate than traditional laboratory testing of routing devices that are designed to simulate a generic network testing environment. In a similar manner, more than one router under test may be interconnected and tested together utilizing the load amplifiers to test the operation of the routers in combination. The testing of multiple routing devices may include generating an initial traffic load to a first router of the multiple routers, utilizing the load amplifiers to amplify the traffic load on the first router and a second router, and monitor the performance of the first and/or the second router under test.

The load amplifiers used to test a large traffic router may also be used to determine a packet loss value associated with the router. For example, the amplification level of the load amplifiers may be adjusted during testing until an equilibrium of amplified traffic and packet loss is attained. The load amplifiers may then be configured to provide the amplification level at which traffic equilibrium is reached to a testing device. The testing device may then use the amplification levels of the load amplifiers to calculate a packet loss value for the router under test. Further adjustments to the amplification or operation of the load amplifiers during testing may be conducted to alter other aspects of the router testing.

Beginning with FIG. 1, a schematic diagram illustrating an exemplary operating environment 100 for load testing a network router 102 (or other type of networking device) utilizing one or more load amplifiers in accordance with aspects of the present disclosure is shown. As discussed above, a network device 102 may be placed under test in the operating environment 100, such as a testing laboratory or deployed into a test or active network. In one particular implementation, a network router 102 may be placed in the test environment 100 to test the various capabilities and performances of the device. In some instances, the network router 102 may be a high capacity router configured to process large traffic loads for use in large telecommunication or data networks. In general, generating large traffic loads to test such network devices may be expensive to conduct as large-capacity traffic generating devices are often expensive. A more cost-effective method for testing the network device 102 may be to utilize one or more load amplifier 108-112 devices connected to one or more input/output ports of the network device 102. In general, the load amplifiers 108-112 may amplify an initial, relatively small traffic load from a load generator 104 to generate a large volume of traffic (or a "high traffic load") for testing of the network device 102. In one implementation, the load generator 104 may be configured to provide a relatively small initial traffic load to the device 102 under test. To generate the traffic load, the load generator 104 may generate and transmit one or more communication packets comprising a body portion and a header portion. The header portion of the communication packets generated by the load generator 104 may include a destination address or other routing address for use by the router 102 in routing the packet. For example, the router 102 may obtain the destination address from the header and compare the obtained address to a routing table 106 maintained by the router. The routing table 106 may, in general, provide instructions or other indications on a routing action for the router 102 to execute in response to receiving a destination address from a communication packet. For example, the routing table 106 may provide an output port of the router 102 for egress of the packet from the router based on the destination address. The routing table 106, in some instances, may be provided by a testing device or by the load generator 104 itself to the router 102 for storage so that the router may utilize the corresponding destination address and routing instructions of the routing table 106 to route a received packet. In this manner, the load generator 104 may generate packet headers with recognizable destination addresses included in the routing table 106 such that the router 102 may determine an output port for routing of received packets.

In a typical routing testing environment, a load generator provides all of the test communication packets to the device under test, with the output ports of the router 102 being monitored to verify proper routing of the testing packets. However, providing and monitoring a large traffic load to simulate the network conditions for the router 102 may be an expensive process. Rather than utilizing a load generator to generate the large traffic load for the test, one or more load amplifiers 108-112 may alternatively be connected to ports of the router 102 and configured to amplify a small initial traffic load and generate the large traffic load used to test the router 102. For example, a first output port 114 of the router 102 may be connected to an input of a load amplifier 108. Some or all of the initial load traffic provided by the load generator 104 to the router 102 may be configured to include an address header that, based on the information stored in the routing table 106, is directed by the router 102 to the output port 114 upon which the load amplifier 108 is connected. As described in more detail below, the load amplifier 108 may be configured to amplify the traffic load received at the amplifier through replication of the communication packet, which in turn is routed back to the router. Thus, rather than receiving a large traffic load from the load generator 104, the load amplifier 108 may instead amplify some or all of the initial traffic load from the generator to a large traffic load, thereby generating a large traffic load without the need for a large and expensive load generator.

In one example, the load amplifier 108 may receive a communication packet from the router 102 via output port 114. Upon receipt, the load amplifier 108 may generate one or more new packets from the received packet. The new packets may, in some instances, include the same or a substantially similar payload or body of the received packet, such that the processing and generation by the load amplifier 108 for the duplication of the packet is lessened when compared to generation of a new packet. Although the payload of the received packet may be duplicated, the load amplifier 108 may alter one or more aspects of the header portion of the new packets to change the destination address of the new packets such that a new packet is generated. In this manner, the new packets may be treated as new traffic packets when received at the routing device 102. Such alteration of the destination address in the new packets may be based on the information stored in the routing table 106 of the router 102 and may, in some instances, be used to test various routing or processing features of the routing device 102. For example, the new packets may include an MPLS routing tag in the header to test MPLS-based routing techniques of the router 102. In general, any aspect of the routing function of the router 102 may be tested through the alterations to the header information of the newly generated packets by the load amplifier 108.

The newly generated communication packets based on the received packet may be transmitted back to the router 102 over one or more output transmission lines 120. Although three output transmission lines 120 for load amplifier A 108 are illustrated in the environment 100 of FIG. 1, any number of output transmission lines may connect the load amplifier 108 to any number of input ports of the router 102. In some instances, the number of output transmission lines 120 from the load amplifier 108 may correspond to a traffic amplification value of the amplifier. For example, the load amplifier 108 may be configured to replicate an input packet two times, or a 3X amplification. In such a circumstances, the load amplifier 108 may be configured to route the received packet back to the router 102 on a first transmission line 120, route a first replicated packet on a second transmission line, and route the second replicated packet on a third transmission line. As each packet may include a different destination address (and therefore a potentially different output port from the router 102), the router analyzes each packet as a separate communication packet and routes each packet accordingly. In this manner, the load amplifier 108 may amplify the received packet into multiple new packets from the single received packet. The load amplifier 108 may continue this amplification process for each received packet to quickly amplifier or otherwise generate a high traffic load for testing the capabilities and operations of the router 102.

In some instances, the router 102 may be connected to multiple load amplifiers 108-112. For example and as illustrated in FIG. 1, the router 102 may be connected to a first load amplifier 108 via output port 114, a second load amplifier 110 via output port 116, and a third load amplifier 112 via output port 118. Any number of load amplifiers 108-112 may be connected to the router 102 based on the number of available output ports of the router. Each load amplifier 108-112 may be configured to amplify received traffic through the replication and header alteration process described above. Thus, each load amplifier 108-112 may include one or more output transmission lines 120-124 for transmitting the amplified traffic load back to the router 102. In addition, each connected load amplifier 108-112 may be individually configured or programmed to alter the header packets and/or provide an amplification level that is the same or different from other connected load amplifiers 108-112. In this manner, the load amplification process of the environment 100 may be customizable by a testing device through the control and configuration of the load amplifiers 108-112 connected to the router 102 to test various aspects of the router 102 under test.

In some instances the load amplifiers 108-112 may be physical devices connected, via a communication cable, to the output ports of the router 102. In other instances, however, the load amplifiers 108-112 may be instantiated in a cloud computing environment (such as cloud computing environment 126 of FIG. 1) to provide modular and scaling capabilities to the load amplifiers. For example, each load amplifier 108-112 may be configured as a virtual machine instantiated on resources provided by the cloud computing environment. The number and configuration of the load amplifiers 108-112 may therefore be altered in real time based on a need for the testing procedure. For example, a testing device may request additional virtual machines as load amplifiers or other cloud computing resources for testing that requires a large amount of traffic amplification. Such resources may be returned to the cloud computing environment upon completion of the large traffic load testing. Thus, although described herein as load amplifier devices, one or more of the operations of the described load amplifiers may be executed by one or more virtual machines instantiated in a cloud computing environment. Through the use of the cloud computing environment and the virtual load amplifiers, customization of the testing of the router 102 or network device may be achieved. For example, control or management of the alteration of packet headers and/or the replication process for received packets may be controlled through configuration or alteration to an instantiated virtual load amplifier. In some instances, however, the load amplifiers 108-112 may be hardware devices, software programs, or a combination of hardware devices and software programs.

Figure 2:
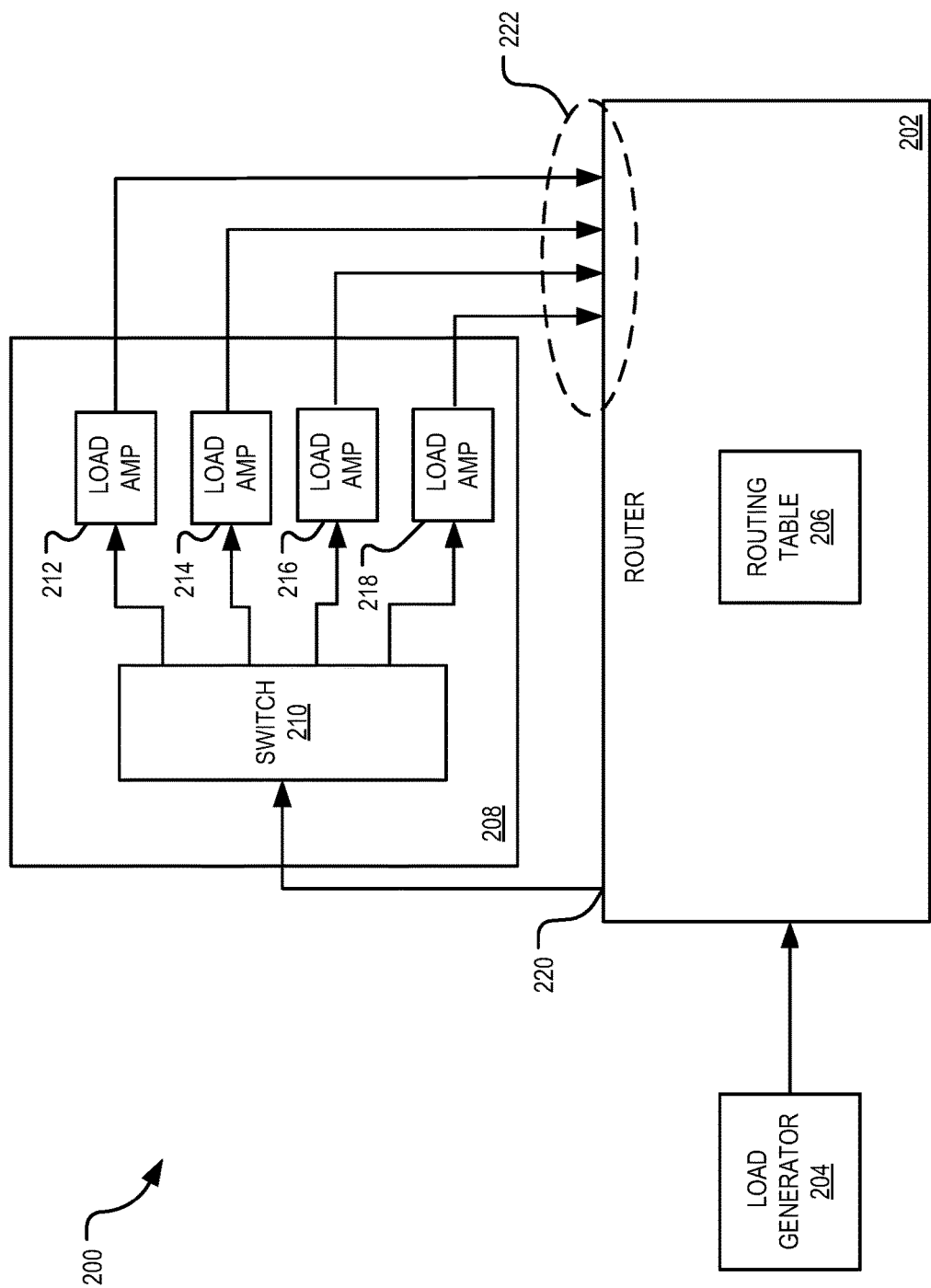
FIG. 2 is a schematic diagram illustrating a load amplifier system for load testing a network router in accordance with aspects of the present disclosure.

FIG. 2 is a schematic diagram illustrating a load amplifier system 208 for load testing a network router 202 in accordance with aspects of the present disclosure. The load amplifier system 208 illustrated in FIG. 2 is but one example of a load amplifier system and may, in some instances, be instantiated in a cloud computing environment. Further, although one such load amplifier system 208 is illustrated in FIG. 2, any number of load amplifier systems 208 may be connected to the router 202, as explained above and as illustrated in FIG. 1.

Many of the components of the environment 200 of FIG. 2 are similar to those described above. For example, a router 202 including a routing table 206 may be under traffic load testing designed to replicate operating conditions of a network. A load generator 204 may be connected to the router 202 to provide an initial testing load to the router. The router 202 may, based on information included in the routing table 206, transmit some or all of the initial testing load to output port 220 for transmission to load amplifier system 208. In the implementation illustrated in FIG. 2, the load amplifier system 208 may include a switch 210 or other network switching component or device configured to route received packets onto one of several output ports of the switch. In the particular example shown, the switch 210 includes four output ports for transmission of received packets. In general, the switch 210 may include any number of output transmission ports for providing received packets. In one example, the switch 210 may spread the received packets onto the output ports evenly in a round-robin fashion to load balance the received packets among the output ports. In other examples, the switch 210 may route the received packets onto any of the available output ports based on routing procedures of the switch. Also, the load amplifier system 208 may include any number of switches 210. In one particular example, the load amplifier system 208 may include a plurality of input ports, each with a corresponding switch to redirect received packets to one of multiple output ports.

Each output port of the switch 210 may be connected to a load amplifier 212-218 that performs one or more processes described above. For example, load amplifier 212 may replicate received packets, alter one or more aspects of headers of the received packet and/or replicated packets, and transmit the amplified packets on one or more output lines connected to one or more input ports 222 of the router 202. In one example, each load amplifier 212-218 may be configured to provide a 2X amplification for each received packet, although each load amplifier 212-218 may be configured to provide any amplification level supported by the connections to the router 202. Further, each load amplifier 212-218 may be configured independently from the other load amplifiers 212-218 in the load amplifier system 208 to further customize the tested features of the router 202 and provide different amplification levels than other load amplifiers in the system 208. Further still, although illustrated as having one output transmission line, each load amplifier 212-218 may be connected to multiple output transmission lines and/or may share output transmission lines among the load amplifiers 212-218 for transmission of the amplified traffic to the input ports 222 of the router 202. Through the amplification system 208, traffic transmitted by the router 202 to the system 208 may be amplified and returned to the router 202 for large traffic load testing of the router.

As the load amplification system 208 may be instantiated in a cloud computing environment, the configuration and number of the components of the load amplification system 208 may be virtually scalable to accommodate different traffic loads. For example, additional switches 210 may be virtually added to the system 208 to receive additional input packets from the router 202. Further, more or fewer load amplifiers 212-218 may be virtually connected to the switch 210 to provide more or less amplification of the input traffic load. Such scaling may occur during router testing or prior to testing and may, in some instances, be requested by a testing device or controller to address the demands or parameters for the traffic load test. In general, a larger traffic load test may cause instantiation of more switches 210 and/or load amplifiers 212-218, result in a higher amplification setting for the load amplifiers, or otherwise increase the traffic amplification for the router 202 under test.

Figure 3:
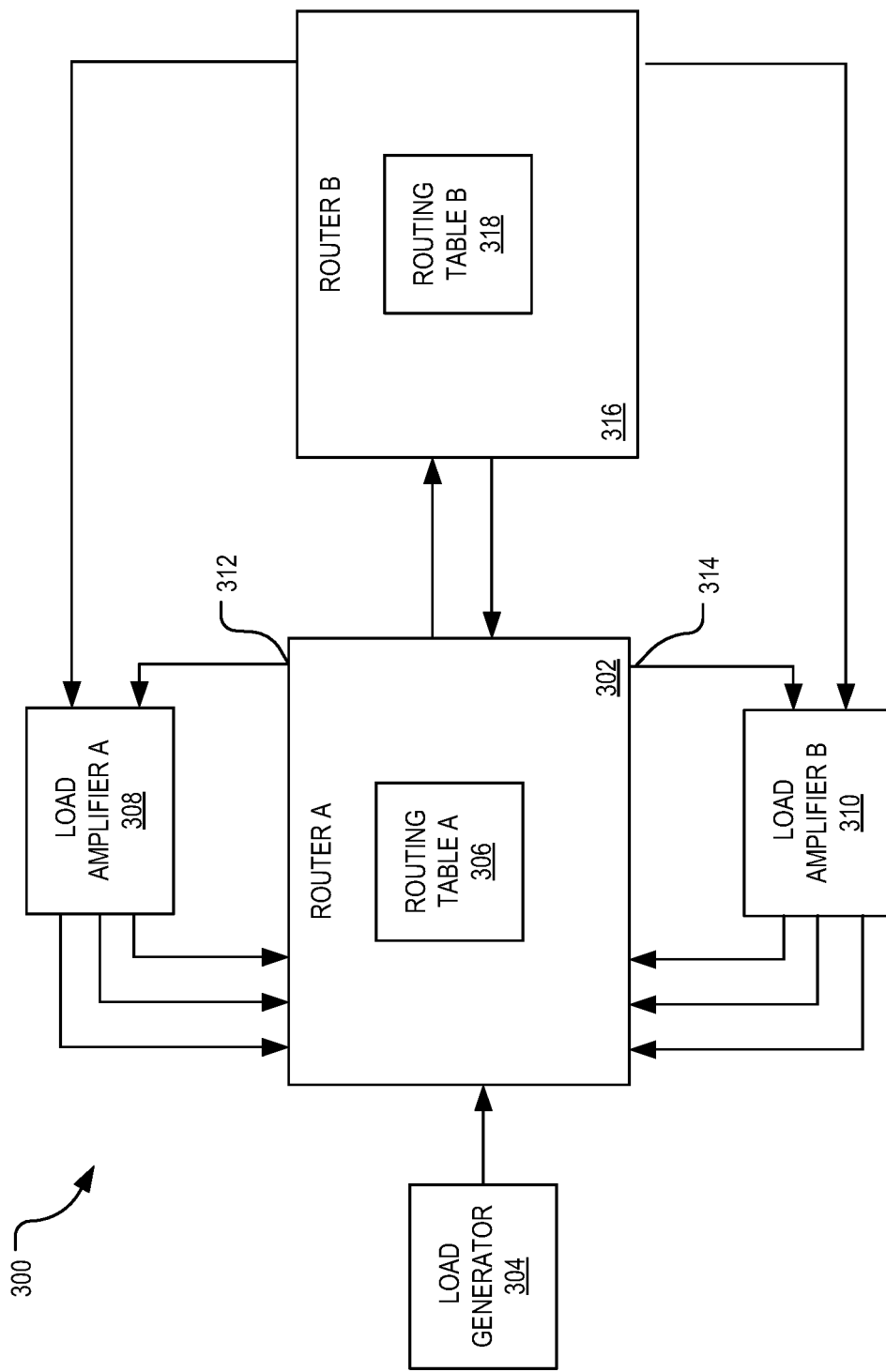
FIG. 3 is a schematic diagram illustrating an exemplary operating environment for load testing multiple network routers utilizing load amplifiers in accordance with aspects of the present disclosure.

The load amplifiers and other systems described herein may also be used to test high traffic volume performance and interactions for multiple, interconnected network devices. For example, FIG. 3 is a schematic diagram illustrating an exemplary operating environment 300 for load testing multiple network routers or other network devices utilizing load amplifiers in accordance with aspects of the present disclosure. Similar to above, a router 302 may be load tested through the testing environment 300 through initiation of a load generator 304 to provide an initial traffic load to the router A 302. The initial traffic load from the load generator 304 may be less than the total traffic load utilized for the test such that load amplification may be provided through one or more load amplifiers 308, 310. A first router, router A 302, may route the initial traffic load based on information contained in the routing table 306 stored in or otherwise associated with router A. One or more load amplifiers 308-310 may be connected to one or more output ports of the router A 302 under test to amplifier the traffic load, as described above. In addition, the first router 302 under test may be connected to a second router, router B 316, with its own router table B 318. In general, router A 302 and router B 316 may exchange traffic and/or routing information, similar to routers within a telecommunications network. For example, router A 302 may advertise one or more network addresses, such as a range of IP addresses, for which router A may be responsible for routing. The advertised routes from router A 302 may be received at router B 316 and one or more corresponding entries with the announced routing information may be stored in routing table B 318. In a similar manner, routes or addresses associated with router B 316 may be announced by router B and stored in router table A 306. Through this announcement process, the routers 302, 316 may establish routes between the two devices as stored in the respective routing tables 306, 318.

To load test the router A 302 and/or the router B 316, traffic from the router A 302 and the router B 316 may be provided to and amplified by the load amplifiers 308-310. More particularly, router A 302 may be configured (through the routing table A 306) to route traffic to load amplifier A 308 and/or load amplifier B 310 to amplify the traffic. Similarly, router B 316 may also be in communication with the load amplifiers 308, 310 and, based on routing table B 318, be configured to route traffic to the load amplifiers to amplify the testing traffic. Traffic may also be routed between router A 302 and router B 316. Such interactivity between router A 302 and router B 316 may be monitored to determine or test how router A 302 and router B 316 interact during a high traffic volume generated by the load amplifiers 308-310. The inclusion of router B 316 in the testing environment may further simulate network conditions when testing either router A 302 or router B 316 under high traffic load. For example, router A 302 and/or router B 316 may be configured or provisioned similar to how the devices may be provisioned or configured in a network. The load amplifiers 308, 310 may generate the high traffic load and the interactions between the routers may be monitored to test how each or both of the devices would operate in the network under the high traffic load conditions. In this manner, more than one network device may be tested in a test environment that simulates network conditions of multiple network devices.

In some instances, router A 302 may operate with a first communication protocol and router B 316 may operate with a second communication protocol, different than the first communication protocol. The respective routing tables 306, 318 of the routers 302,316 under test may include information to route received packets between the routers or to the load amplifiers 308,310. Similarly, load amplifiers 308,310 may be configured to alter the header information of received packets to match destination address information of routing table A 306 to instruct router A 302 to route packets to router B 316 and/or to load amplifiers 308,310. For example, the load generator 304 may provide the initial traffic load that includes routing information that causes router A 302 to route the packets of the initial traffic load to load amplifier A 308 and load amplifier B 310. Load amplifier A 308 and load amplifier B 310 may be configured to replicate the received packets and alter the header information of the replicated packets. The alteration to the header information may correspond to information in routing table A 306 that instruct router A 302 to route particular packets to router B 316. The load amplifiers 308,310 may then transmit the amplified packets to router A 302 and, based on the information in routing table A 306, some of the amplified packets may be routed to router B 316. Based on routing information included in routing table B 318, router B 316 may then transmit the received packets to load amplifier A 308 and/or load amplifier B 310 for further amplification (e.g., replication and altering of header information) and further transmission back to router A 302. Monitoring of traffic both into and out of router A 302 and router B 316 may provide an indication of the performance of the network devices under the high traffic load conditions. The testing environment 300 of FIG. 3 may therefore provide testing of routers or other network devices with different communication protocols under high traffic conditions through the use of the load amplifiers 308-310 connected to one or more routers under test.

Figure 4:
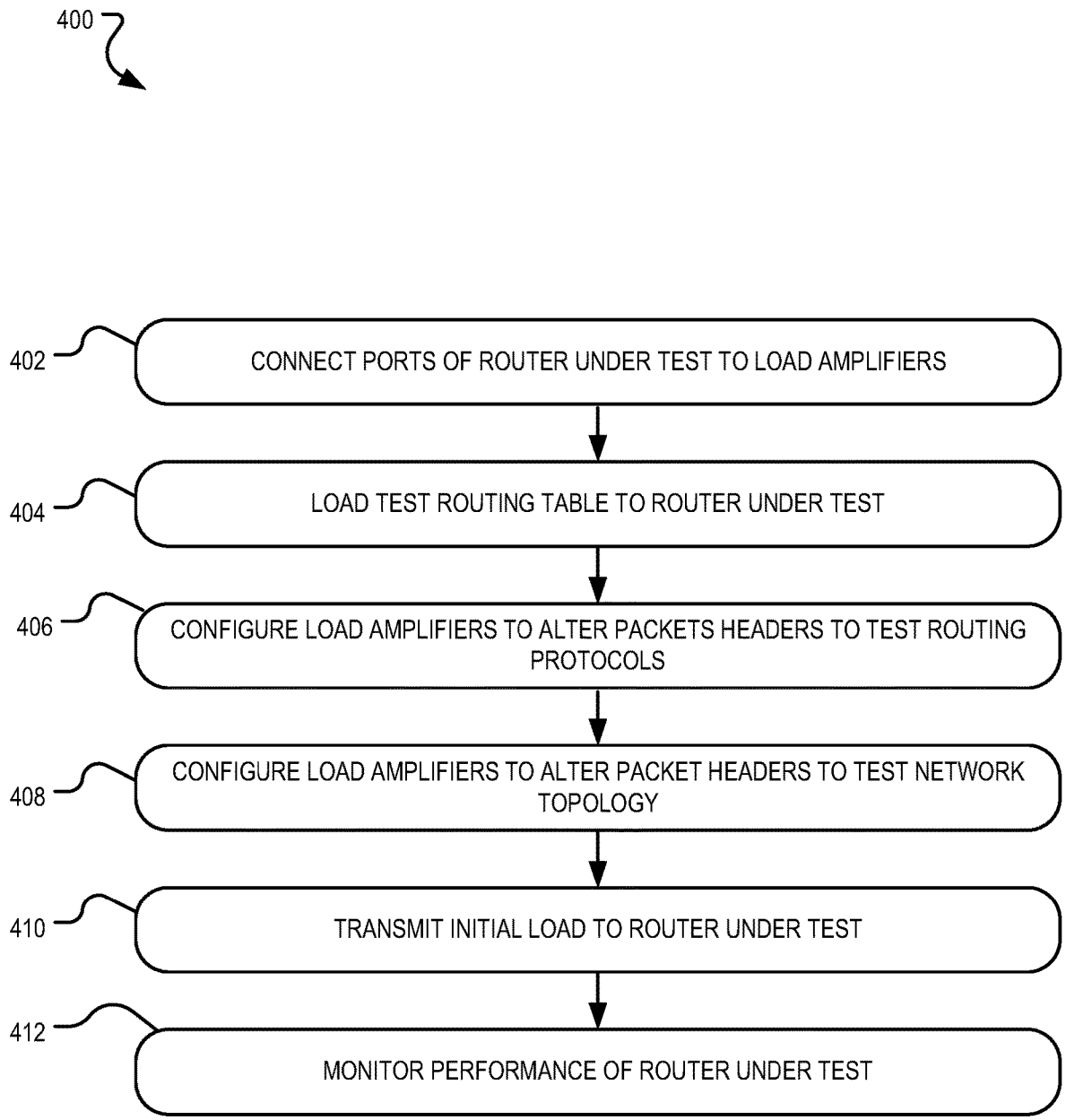
FIG. 4 is a flowchart of a method for load testing a network router device utilizing load amplifiers in accordance with aspects of the present disclosure.

FIG. 4 is a flowchart of a method for load testing a network router device utilizing load amplifiers in accordance with aspects of the present disclosure. The operations of the method 400 of FIG. 4 may be performed by a testing device used during high traffic load testing of a network device, such as a high-capacity router 102. The testing device may communicate with the various components of the testing environment, such as the components of the testing environment 100 of FIG. 1. As discussed above, more or fewer components, such as additional load amplifiers and/or additional network devices under test, may be present in the testing environment 100 and controlled by the testing device. The operations of the method 400 of FIG. 4 may be performed via hardware components of the testing device, software programs of the testing device, or a combination of hardware and software components.

Beginning in operation 402, one or more load amplifiers 108-112 may be connected to ports of the router 102 under test. As described above, the load amplifiers 108-112 may be, in some instances, implemented in a cloud computing environment and connected to or otherwise in communication with one or more ports of the router 102. In one implementation, the connections may accommodate a 100 Gigabyte per second (Gbps) bandwidth of traffic between the router 102 and the load amplifiers 108-112, although more or less bandwidth may be supported by the connections. In still other embodiments, the load amplifiers 108-112 may be configurable devices connected to the ports of the router 102 such that the operational capacities, parameters, and other technical features of the load amplifiers may be adjusted or scaled in support of various types of high traffic load tests.

In operation 404, a test routing table 106 may be uploaded to or otherwise provided to the router 102 under test. The routing table 106 may include routing information for routing packets received at the router 102, such as from a load generator device, load amplifiers, or other networking devices under test. More particularly, the routing table 106 may include a list of IP addresses or other destination address information (such as MPLS tags, MAC addresses, etc.) and a corresponding egress port from the router 102 through which a received packet with the destination address is to be routed. The routing table 106 information may be maintained by the testing device and, as explained in more detail below, used by the testing device to configure the load amplifiers 108-112 during alteration of the header information of amplified packets. For example, the load amplifiers 108-112 may be configured to alter destination address information in the amplified packets to match a destination address stored in the routing table 106 such that the router 102 may determine an egress port for amplified packets received at the router 102. In addition, the routing table 106 may be configured, in combination with the load amplifiers 108-112 to test various features of the router 102 operation, such as targeting particular ports for egress by the high traffic load, testing one or more communication protocols for transmission of packets supported by the router 102, emulating one or more aspects of a target network, and the like. In instances where multiple network devices are to be tested simultaneously, a routing table may be loaded or provided to each corresponding network device by the testing device to control the routing of packets by the respective network devices.

In operation 406, one or more of the connected load amplifiers 108-112 may be configured to alter packet headers of received packets to test routing protocols of the router 102. In particular and as mentioned above, the load amplifiers 108-112 may be configured to generate destination addresses in the headers of the altered packets to targeting particular ports for egress from the router 102, testing one or more communication protocols for transmission of packets supported by the router 102, and the like. For example, the routing table 106 of the router 102 may include a route to egress the router via port 116. Further, port 116 may include a configuration supporting a particular communication protocol. Load amplifier A 108 may be configured to alter header information of one or more packets according to the routing table 106 such that the altered packets are routed to port 116 of the router 102 to test the communication protocol feature of the router 102. Further, one or more ports of the router 102 may be tested for high traffic loads and the load amplifiers 108-112 may be configured to alter destination addresses to correspond to addressed included in the routing table 106 to direct traffic to the tested ports. Further, as described above, the load amplifiers 108-112 may generate additional packets, such as through replication of received packets, to amplify the traffic load used to test the router 102. In this manner, the load amplifiers 108-112 may be used to amplify an initial traffic load and be configured to specifically generate amplified traffic to test various features of the network device under test.

In a similar manner, the load amplifiers 108-112 may be configured to mimic or emulate a network topology to test the performance of the router 102 under network conditions in operation 408. In particular, the load amplifiers 108-112 may be configured to alter the destination address portion of headers of communication packets to appear to the router 102 as being transmitted from routers or other network devices of the emulated network. The router 102 may then route the altered packets according to the routing table 106. A testing device may monitor the routing of the altered packets to determine proper routing of packets by the router 102 prior to installation in the network. In this manner, the load amplifiers 108-112 may be configured to emulate devices of a network such that the router 102 may be tested in a testing environment 100 similar to that of the target network in which the router is to be installed. The load amplifiers 108-112 may be configured to emulate the header information of any number of network devices to emulate a working or proposed network topology. As the router 102 uses the header information to route packets based on the routing table 106, the operation of the router 102 may be tested in an emulated network topology to determine the proper functionality of the router 102.

In operation 410, instructions may be transmitted to the load generator 104 to begin transmission of an initial traffic load to the router 102. The initial traffic load from the load generator 104 may be less than the amplified traffic load for testing of the router 102. Further, the initial traffic load may include generated communication packets tailored to test one or more features of the router 102 under test. The instructions to initiate the initial traffic load may be generated and transmitted by the testing device to begin testing of the router 102. The load amplifiers 108-112 may then begin amplifying the initial traffic load to generate the high traffic testing load for the router 102 in a scalable and cost-effective manner. During amplification of the traffic load and/or after amplification, one or more performance aspects of the router being tested may be monitored in operation 412. Such monitoring may be performed by a testing device and may or may not be the same device that configures the load amplifiers. The operational performance of the router may be stored, analyzed, or otherwise determined by the testing device to determine the performance of the router when deployed in a high traffic network environment.

Figure 5:
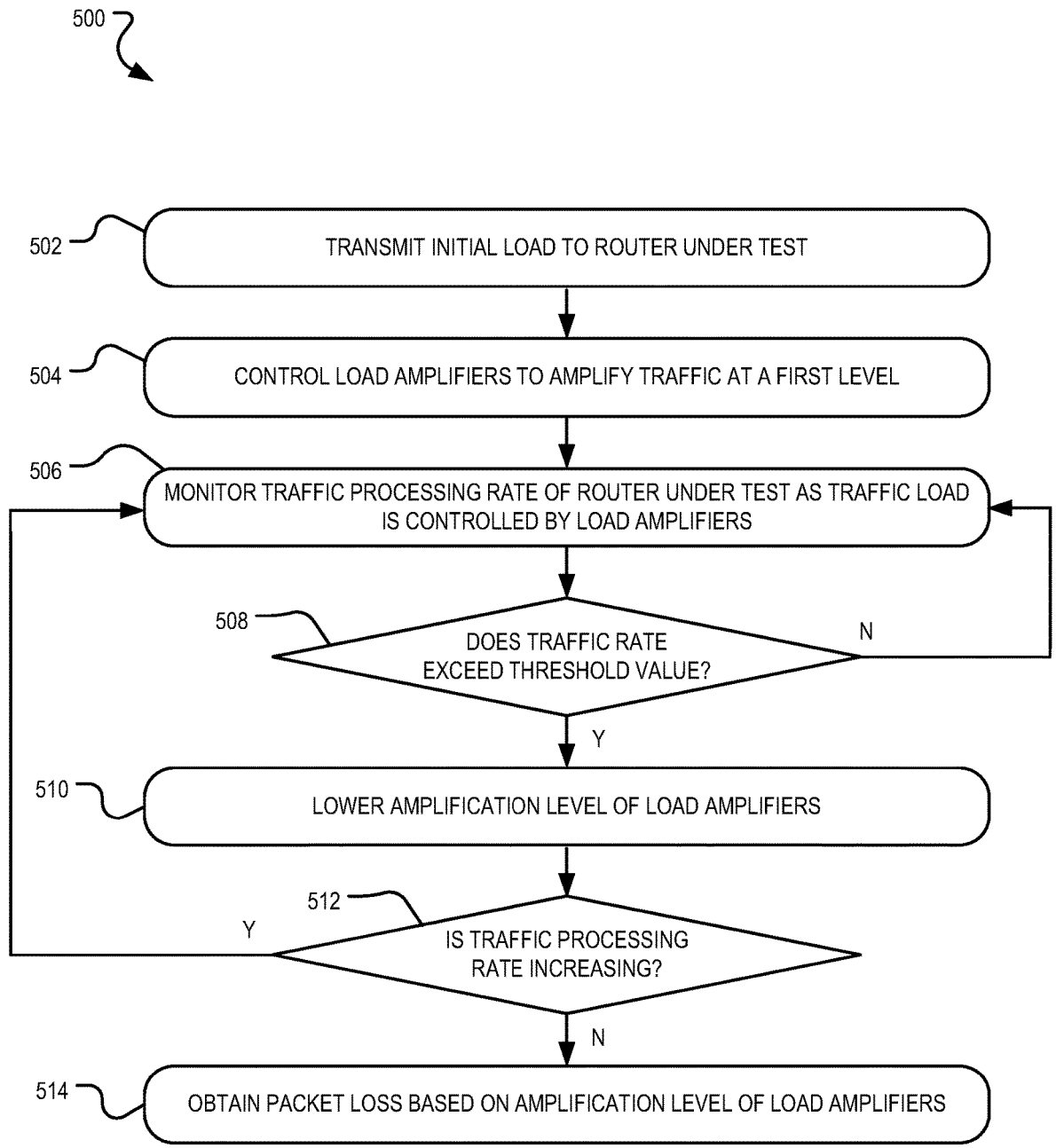
FIG. 5 is a flowchart of a method for obtaining a packet loss indication of a network router device utilizing load amplifiers in accordance with aspects of the present disclosure.

In some instances, the configuration of the load amplifiers 108-112 may be adjusted during testing of the router 102 in response to monitored conditions of the router during the test or in response to a preplanned testing technique. For example, a testing device testing the router in the above scenarios may control the alteration performed on the headers of the packets of the amplified traffic load to alter how the router routes the amplified traffic, such as by directing some or all of the traffic load to particular ports of the router 102 or testing different features of the router 102 operation. In some instances, the routing table 106 of the router 102 may also be adjusted during testing with new routing information to further adjust the testing of the router 102 through control of the routing of the amplified traffic. In another example, the amplification level of the load amplifiers 108-112 may be adjusted during testing to determine a packet loss performance metric for the router 102 under test. In particular, FIG. 5 is a flowchart of a method 500 for obtaining a packet loss indication of a network router device utilizing load amplifiers in accordance with aspects of the present disclosure. Similar to above, the operations of the method 500 of FIG. 5 may be performed by a testing device in communication with the components of the testing environment 100, such as the load amplifiers 108-112. Such operations may be performed via one or more hardware components, one or more software programs, or a combination of hardware and software components.

Beginning in operation 502, the load generator 104 may transmit the initial traffic load to the router 102 under test as described above. The initial traffic load may include communication packets corresponding to information in the routing table 106 stored and maintained by the router 102 to route the initial traffic load to one or more load amplifiers 108-112 connected to ports of the router 102. In operation 504, the load amplifiers 108-112 may be controlled to amplify the traffic load at a first amplification level. In particular, the load amplifiers 108-112 may be configured to perform operations similar to above to replicate received communication packets, alter header information to create a new destination address for one or more of the replicated packets, and transmit the amplified packets to the router 102. The first amplification level of the load amplifiers 108-112 may be selected to rapidly amplify the initial traffic load to an upper threshold traffic load level of the router 102 to test the routing capabilities of the router at a high traffic load.

In operation 506, the traffic processing rate of the router 102 under test may be monitored, perhaps by a testing device. In general, the testing device may monitor a number of communication packets transmitted or routed by the router 102. In one instance, monitoring of the processed traffic may include monitoring one or more output ports of the router 102 for transmitted packets. In operation 508, the testing device may determine if the monitored traffic processing rate exceeds a threshold value. In one instance, the threshold value may be selected for or programmed into the testing device to be less than the upper capacity of traffic that may be processed by the router 102 but more than a minimum testing traffic capacity selected for the router test. In other words, the traffic processing rate of the router 102 may be monitored to ensure an amount of traffic load selected for the router test. If the traffic rate does not exceed the selected threshold value, the traffic processing rate may continue to be monitored by returning to operation 506 until the threshold value is exceeded.

Once the monitored traffic rate exceeds the threshold value of traffic load for the router 102 test, the amplification level for the load amplifiers 108-112 connected to the router 102 may be lowered in operation 510. The adjustment to the amplification level of the load amplifiers 108-112 may be, in some instances, based on the first amplification level of the load amplifiers. In other instances, the adjustment to the amplification level of the load amplifiers 108-112 may be selected by or for the testing device. In operation 512, it may be determined if the processed traffic rate of the router 102 is increasing. If the processed traffic rate of the router 102 continues to increase, the testing device may return to operation 506 to monitor the traffic processing rate and determine if the rate exceeds the threshold value. If the processing rate continues to exceed the threshold value, the amplification level of the load amplifiers 108-112 may again be lowered. This cycle may continue until the traffic processing rate ceases to increase or the traffic rate hits an equilibrium where an amplification is provided to the traffic load by the load amplifiers 108-112 but the traffic load processed by the router 102 does not increase. Upon this occurrence, the amplification level of the load amplifiers 108-112 may be determined and a packet loss measurement of the router 102 may be obtained from the amplification level of the load amplifiers 108-112 when the processed traffic rate is at an equilibrium in operation 514. In other words, the router 102 may, during processing of communication packets, drop or lose packets at a packet loss rate. As the load amplifiers 108-112 are amplifying the traffic load at a particular amplification level or rate, an equilibrium of processed traffic by the router 102 in such a testing condition indicates that the packet loss rate for the router 102 equals the amplification level of the load amplifiers 108-112. As each load amplifier 108-112 may be amplifying the traffic load at different amplification levels, the amplification levels for each load amplifier 108-112 may be added to determine the packet loss rate of the router 102 under test. In this manner, the amplification levels of the load amplifiers 108-112 connected to the router 102 may be adjusted until an equilibrium of amplified traffic and packet loss is achieved, from which the packet loss rate of the router 102 may be determined by the testing device.

FIG. 6 is a block diagram illustrating an example of a computing device or computer system 600 which may be used in implementing the embodiments of the components of the network disclosed above. For example, the computing system 600 of FIG. 6 may be the router 102 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges 624 or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for testing a network device, the method comprising:
   initiating, from a traffic load generator, an initial testing traffic load to a networking device, the networking device routing a portion of the initial testing traffic load to a first output port of the networking device, the first output port in communication with a load amplifier to:
      replicate a payload of a first packet of the initial testing traffic load into a replicated packet;
      alter a header portion of the replicated packet, the altered header portion comprising a destination address for the replicated packet; and
      transmit the first packet and the altered replicated packet to a plurality of input ports of the networking device;
   transmitting, to the networking device, a routing table comprising a routing path correlating a second output port of the networking device to the destination address of the altered heading portion of the replicated packet; and
   transmitting the altered replicated packet to the second output port based on the routing table.

2. The method of claim 1, wherein the load amplifier is instantiated as a virtual machine in a cloud computing environment.

3. The method of claim 1 further comprising:
   controlling an amplification level of the load amplifier, the amplification level corresponding to replication of the payload of the first packet of the initial testing traffic load into plurality of replicated packets, a number of the plurality of replicated packets equal to the amplification level.

4. The method of claim 3 further comprising:
   monitoring a traffic rate at the networking device; and
   adjusting the amplification level of the load amplifier in response to the monitored traffic rate at the networking device.

5. The method of claim 3 further comprising:
   adjusting the amplification level of the load amplifier until a traffic flow rate of the networking device is not increasing; and
   setting the amplification level of the load amplifier as a packet loss rate for the networking device.

6. The method of claim 1, wherein the load amplifier comprises a switch and a plurality of load amplifiers each connected to the switch, the switch load balancing incoming packets to the plurality of load amplifiers.

7. The method of claim 1, wherein transmission of the first packet and the altered replicated packet occurs over a plurality of transmission lines between the load amplifier and the plurality of input ports of the networking device.

8. A system for testing a device, the system comprising:
   a load generator transmitting an initial testing traffic load to a networking device, the networking device routing a portion of the initial testing traffic load to a first port of the networking device; and
   a load amplifier system in communication with the first port of the networking device, the load amplifier system:
      replicating a first packet of the initial testing traffic load into a plurality of replicated packets;
      altering a header portion of each of the plurality of replicated packets to include a destination address for a corresponding replicated packet;
      transmitting the first packet and each of the altered plurality of replicated packets to a plurality of ports of the networking device, wherein the networking device is a router comprising a routing table correlating a second output port of the networking device to the destination address of the altered header portion of the replicated packet; and
      transmitting the altered plurality of replicated packets to the second output port based on the routing table.

9. The system of claim 8, wherein the load amplifier comprises:
   a plurality of load amplifiers;
   a switch transmitting the portion of the initial testing traffic load to the plurality of load amplifiers; and
   a plurality of output transmitters connecting each of the plurality of load amplifiers to a corresponding one of the plurality of ports of the network device.

10. The system of claim 8, further comprising:
    a second networking device receiving an additional portion of the initial testing traffic load and transmitting the additional portion of the initial testing traffic load to the load amplifier system.

11. The system of claim 10, wherein the networking device, based on the altered header portion of a portion of the plurality of replicated packets, routes the portion of the plurality of replicated packets to the second networking device.

12. The system of claim 8, wherein the load amplifier system is instantiated as a virtual machine on a computing device, the computing device in communication with the first port of the networking device.

13. The system of claim 8, further comprising:
    a second load amplifier in communication with a second port of the network device, the second load amplifier;
    replicating a second packet of the initial testing traffic load into a second plurality of replicated packets; and
    transmitting the second plurality of replicated packets to a second plurality of ports of the networking device.

14. The system of claim 8, further comprising:
    a testing device to:
       monitor an operational parameter of the networking device associated with a routing of the first packet and each of the altered plurality of replicated packets; and
       adjust, based on the operational parameter, an amplification level associated with the load amplifier system.

15. A network testing apparatus comprising:
    a load amplifier in communication with a first port of a networking device to receive an initial testing traffic load, the load amplifier:
       replicating a first packet of the initial testing traffic load into a plurality of replicated packets;
       altering a header portion of each of the plurality of replicated packets to include a destination address for a corresponding replicated packet; and
       transmitting the first packet and each of the altered plurality of replicated packets to a plurality of ports of the networking device;
    a routing table correlating a second output port of the networking device to the destination address of the altered header portion of the plurality of replicated packets; and transmitting the altered plurality of replicated packets to the second output port based on the routing table.

16. The network testing apparatus of claim 15, further comprising:
a second load amplifier in communication with a second port of the network device, the second load amplifier:
replicating a second packet of the initial testing traffic load into a second plurality of replicated packets; and
transmitting the second plurality of replicated packets to a second plurality of ports of the networking device.

* * * * *